(12) United States Patent
  Leventhal

(10) Patent No.: US 9,588,946 B2
(45) Date of Patent: Mar. 7, 2017

(54) PANNING A CONTENT AREA OF A MARKUP LANGUAGE DOCUMENT BASED ON MOVEMENTS OF A CURSOR OF A POINTING DEVICE

(71) Applicant: Al Squared, Manchester Center, VT (US)

(72) Inventor: Aaron M. Leventhal, Winchester, MA (US)

( * ) Notice: Subject to any disclaimer, the term of this patent is extended or adjusted under 35 U.S.C. 154(b) by 124 days.

(21) Appl. No.: 14/586,067

(22) Filed: Dec. 30, 2014

(65) Prior Publication Data
US 2015/0186344 A1     Jul. 2, 2015

Related U.S. Application Data

(60) Provisional application No. 61/921,773, filed on Dec. 30, 2013.

(51) Int. Cl.
  *G06F 17/00*     (2006.01)
  *G06F 17/22*     (2006.01)
  *G06F 17/21*     (2006.01)

(52) U.S. Cl.
  CPC ........ *G06F 17/2247* (2013.01); *G06F 17/212* (2013.01)

(58) Field of Classification Search
  None
  See application file for complete search history.

(56) References Cited

U.S. PATENT DOCUMENTS

| | | | |
|---|---|---|---|
| 8,074,181 | B2 | 12/2011 | Zaman et al. |
| 2006/0080590 | A1 | 4/2006 | Jones et al. |
| 2009/0109243 | A1 | 4/2009 | Kraft et al. |
| 2013/0104029 | A1 | 4/2013 | Hendry et al. |
| 2013/0212522 | A1 | 8/2013 | Fleizach |
| 2014/0223280 | A1* | 8/2014 | Choudhury ........... G06F 3/0487 715/234 |

FOREIGN PATENT DOCUMENTS

WO    WO 2013/049162 A1    4/2013

OTHER PUBLICATIONS

Khan, Thomas; "Smooth Div Scroll"; www.smoothdivscroll.com.*
(Continued)

*Primary Examiner* — Asher Kells
(74) *Attorney, Agent, or Firm* — Wolf, Greenfield & Sacks, P.C.

(57) ABSTRACT

Embodiments of techniques for moving visible content elements of at least one markup language document within a display area in response to user input moving a cursor of a pointing device. Visible content elements of the markup language document may be moved in a display area based at least in part on an amount by which a content area that includes the visible content elements extends outside of the display area. For example, a panning facility may determine an amount by which to shift visible content elements in the display area based at least in part on an amount by which a content area that includes the visible content elements extends beyond the display area. The panning facility may move the visible content elements by instructing a viewing application to scroll the visible content elements within the display area.

17 Claims, 11 Drawing Sheets

(56) References Cited

OTHER PUBLICATIONS

International Search Report and Written Opinion mailed Mar. 24, 2015 for Application No. PCT/US2014/72740.
International Preliminary Report on Patentability mailed Jun. 23, 2016 for Application No. PCT/US2014/070160.
International Preliminary Report on Patentability mailed Jul. 14, 2016 for Application No. PCT/US2014/072740.

* cited by examiner

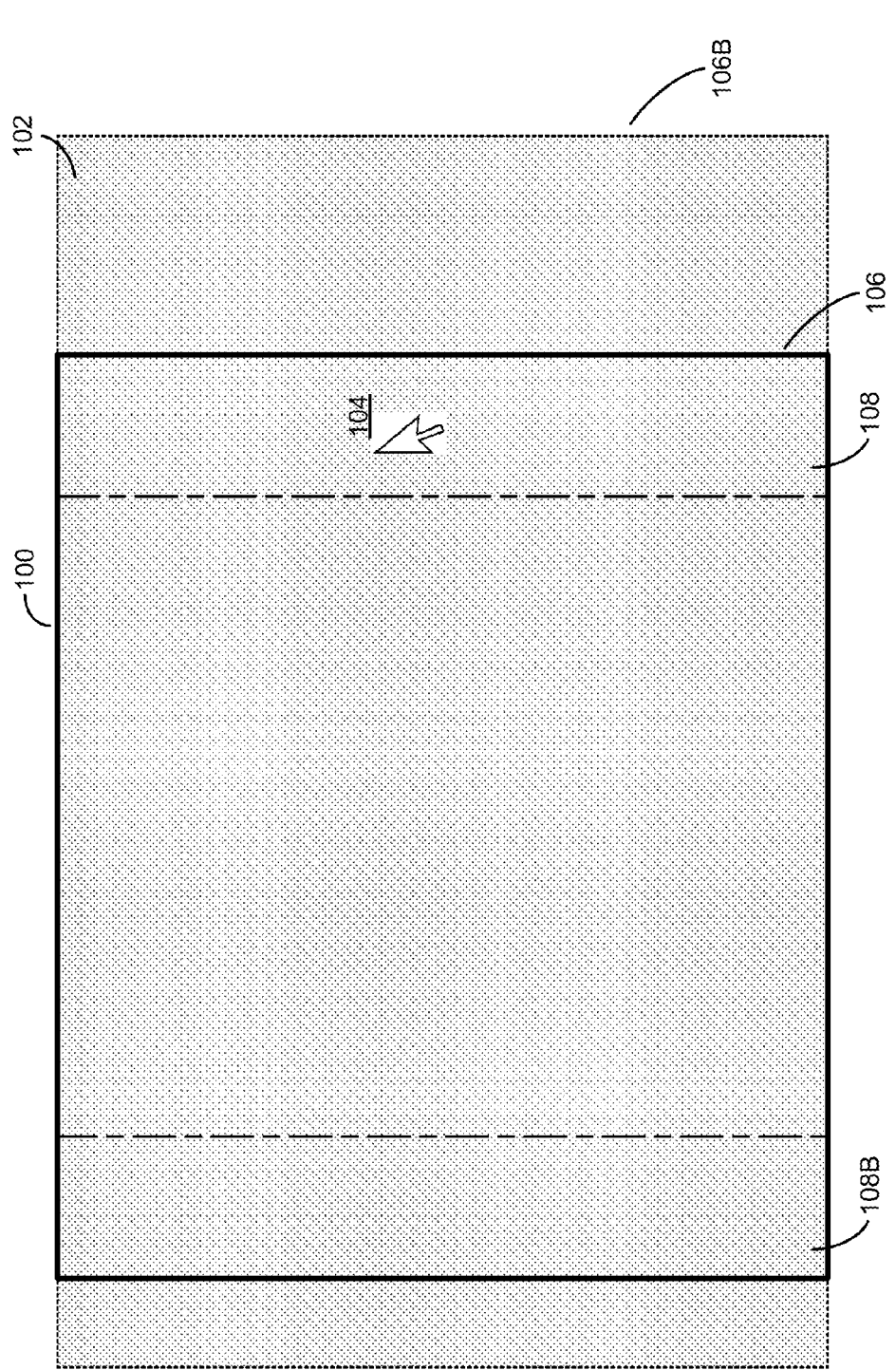

PANNING A CONTENT AREA OF A MARKUP LANGUAGE DOCUMENT BASED ON MOVEMENTS OF A CURSOR OF A POINTING DEVICE

RELATED APPLICATIONS

This application claims priority under 35 U.S.C. §119(e) to U.S. Provisional Application Ser. No. 61/921,773, titled "Techniques for automatic panning in a window via a pointing device" and filed on Dec. 30, 2013, the entire contents of which are herein incorporated by reference.

BACKGROUND

Markup languages include markup elements that may serve to identify or describe content, including that describe how visible content is to be rendered for display. A markup language document may include markup elements describing a content and/or formatting of content of the document.

Web pages are an example of markup language documents. A web page may be implemented as a set of one or more markup language documents, each of which may include content described using Hypertext Markup Language (HTML) elements or Cascading Style Sheet (CSS) elements, and/or elements of other markup languages. The markup elements of a web page may identify text content, image content, scripting language content, or other forms of content and may, for visible content elements, identify a manner in which the visible content elements are to be rendered. For example, the markup elements may identify a size or placement of visible content elements such as an image, or may describe a formatting of visible content elements such as text. A web browser may, upon download of a web page, review the markup elements of one or more markup language documents and render the visible content elements of the web page on a display based on the markup elements.

SUMMARY

In one embodiment, there is provided a method of moving visible content elements of at least one markup language document within a display area in which the at least one markup language document is displayed. At least some of the visible content elements are disposed at positions at which they are at least partially disposed outside of the display area of the at least one markup language document. The method comprises executing, with at least one processor, instructions incorporated within the at least one markup language document to cause the at least one processor to carry out acts of, in response to detecting a user input moving a cursor of a pointing device toward one side of the display area, determining whether a content area of the at least one markup language document, including the visible content elements, extends beyond an edge of the display area on the one side of the display area and, in response to determining that the content area extends beyond the edge of the display area on the one side, changing a position of at least some of the visible content elements.

In another embodiment, there is provided at least one computer-readable storage medium having encoded thereon executable instructions incorporated within at least one markup language document that, when executed by at least one processor, cause the at least one processor to carry out a method of moving visible content elements of the at least one markup language document within a display area in which the at least one markup language document is displayed. At least some of the visible content elements are disposed at positions at which they are at least partially disposed outside of the display area of the at least one markup language document. The method comprises, in response to detecting a user input moving a cursor of a pointing device toward one side of the display area, determining whether a content area of the at least one markup language document, including the visible content elements, extends beyond an edge of the display area on the one side of the display area and, in response to determining that the content area extends beyond the edge of the display area on the one side, changing a position of at least some of the visible content elements.

In a further embodiment, there is provided an apparatus comprising at least one processor and at least one storage having encoded thereon executable instructions incorporated into at least one markup language document. The executable instructions of the at least one markup language document, when executed by the at least one processor, cause the at least one processor to carry out a method of moving visible content elements of the at least one markup language document within a display area in which the at least one markup language document is displayed. At least some of the visible content elements are disposed at positions at which they are at least partially disposed outside of the display area of the at least one markup language document. The method comprises determining a first amount by which a content area of the at least one markup language document, including the visible content elements, extends beyond an edge of the display area on a first side of the display area and setting a width of a margin area of the display area based at least in part on the amount by which the content area of the at least one markup language document extends beyond the edge of the display area on the first side of the display area. The margin area is a portion of the display area on the first side of the display area. The method further comprises, in response to detecting a user input moving a cursor of a pointing device toward the one side of the display area, detecting a second distance that the user input has moved the cursor, determining a movement amount by which to move the visible content elements based at least in part on the first amount by which the content area extends beyond the edge of the display area on the one side and on the second distance, and moving the visible content elements, toward a second side of the display area opposite the first side, based at least in part on the movement amount.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 1A and 1B are illustrations of examples of elements of a graphical user interface with which some embodiments may operate;

DETAILED DESCRIPTION

Figure 1A:
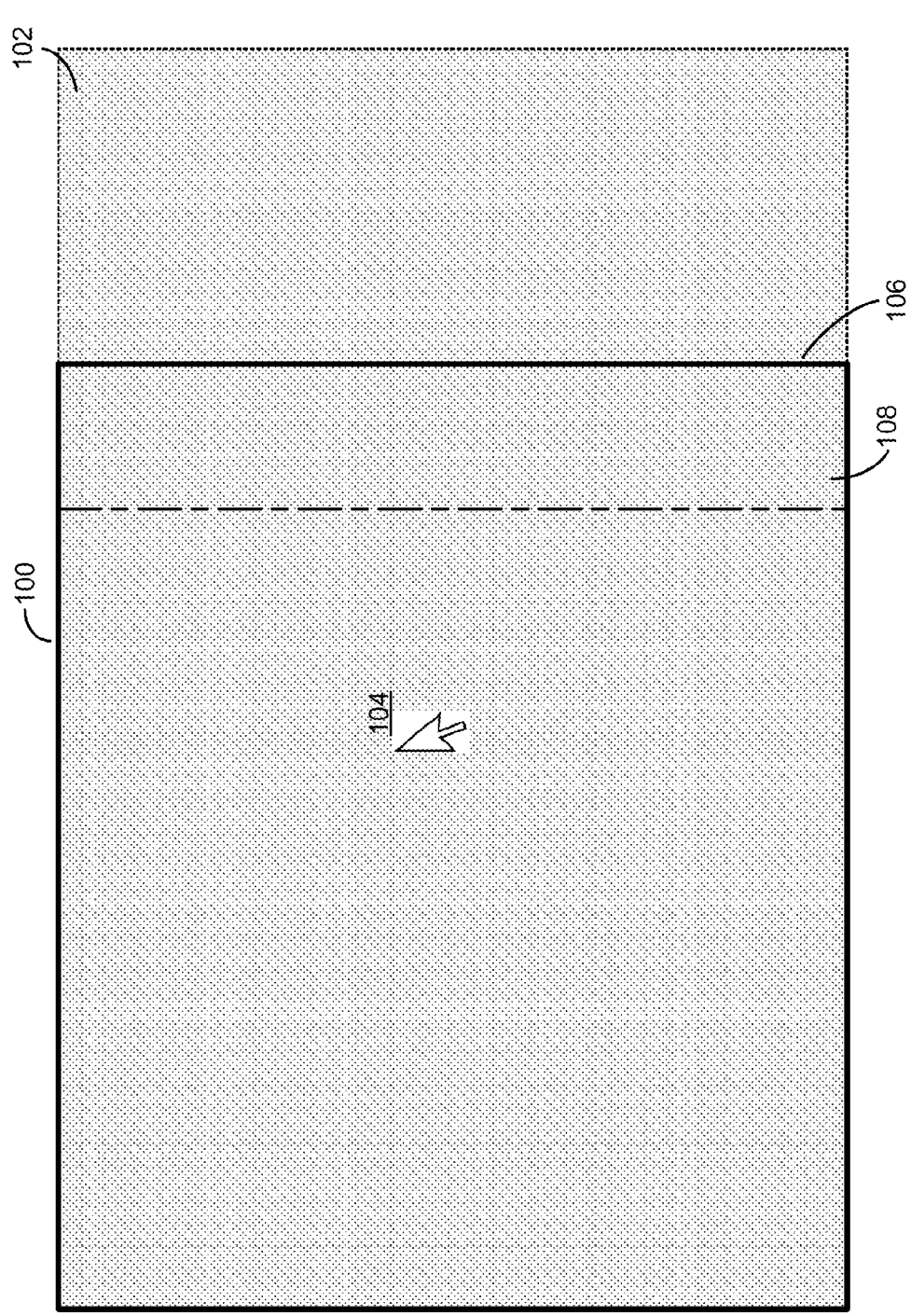

Embodiments described herein relate to techniques for moving visible content elements of a markup language document in a display area of a display screen based on a user input that moves a cursor of a pointing device in the display screen and based on an amount by which the visible content elements of the markup language document extend outside the display area. For example, as the user moves the cursor of the pointing device toward a side of the display area, a panning facility may detect the movement and move the visible content elements of the markup language document in a direction away from that side of the display area. The panning facility may move the content based at least in part on an amount by which the content area extends beyond the display area. Visible content that was positioned outside of the display area may thus be moved into the display area to be viewed by a user.

Movement of visible content, particular web content, into and out of a display area has traditionally been carried out using dedicated graphical buttons in a graphical user interface, such as "scroll bars," or by using a dedicated button in a physical user interface such as via a "scroll wheel" on a mouse, a scroll area of a touchpad, or keyboard buttons like page down, page up, or the spacebar. In such cases, an application program receives the user input and moves the visible content, such as by a fixed amount for each user input.

As an alternative to such graphical or physical buttons, some operating systems or applications support fixing content to a mouse cursor. In such a technique, a functionality of the operating system or application may be used to lock a mouse cursor position, after which visible content displayed within an application program is moved according to mouse movements without moving the mouse cursor. Using such a technique, until the movement of the content is completed and the functionality is disabled, the mouse cursor may be fixed and immobile on the display.

The inventor has recognized and appreciated that traditional techniques for moving web content are inadequate for some users of computing devices. Some users require assistance with using computer interfaces, such as because of their unfamiliarity with the operations or computers or because of disabilities or difficulties of those users. For example, a person who has poor eyesight and is unfamiliar with the operations of computers may have difficulty using the traditional techniques discussed above, such as an elderly person who may have difficulty viewing scroll bars or other buttons in a graphical user interface. In some such cases, the mouse locking functionality described above could be more intuitive and easier for users to use. However, the inventor has recognized and appreciated that triggering such functionality, and subsequently disabling that functionality when it is no longer necessary to move the content, may be a complex operation that may be difficult for or beyond the capabilities of some users. As a result, both the most common approach using scrollbars and the more intuitive approach that fixes the position of the content relative to the mouse cursor may be inadequate for some users. Moreover, as discussed below, the inventor has recognized and appreciated that such techniques may be difficult to implement using markup language documents.

For markup language documents like web pages, a viewing application like a web browser is typically responsible for handling display of content and moving content within a display area. Markup language documents support the incorporation of executable instructions, such as scripting language code, into the markup language document. These instructions may be executed by the viewing application during rendering and display of the markup language document. The inventor has recognized and appreciated that such scripting language code could be used to move content within a display area of the viewing program in response to user input. The inventor has additionally recognized and appreciated that incorporating functionality for moving content within a display area into the markup language document itself may be advantageous for some users, including users with disabilities or difficulties and/or that have limited experience with computers. By incorporating the functionality into the markup language document itself, users would need only to interact with the markup language document within the viewing application and would not need to learn how to trigger and use other functionality, such as of an operating system or third party.

The inventor has recognized and appreciated that there are a variety of ways that scripting language code, disposed within a markup language document, may be used to move content in a content window in response to user input. For example, scroll bars or specific buttons within the window may be displayed in the window, or user keystrokes on a keyboard may be detected. The inventor has recognized and appreciated that these other techniques may be in some ways advantageous as compared to using a pointing device to move content. In particular, the inventor has recognized and appreciated that due to limitations imposed on scripting language code by a viewing application like a web browser, it may be disadvantageous in many cases to move display content based on user input received via movements of a cursor of a pointing device, such as a mouse, track pad, etc. In many web browsers or other viewing programs, information regarding movements of a cursor of a pointing device are only provided to scripting language code when the cursor is disposed within a display area containing the markup language document that includes the code. If the cursor moves outside the display area, then the scripting language code no longer receives information regarding movements of the cursor and thus cannot control movement of the content of the markup language document based on the movements of the cursor. For a user who is unfamiliar with how to operate computing devices, or who may have difficulty perceiving a cursor on the screen, it may be confusing and frustrating that content stops panning when a cursor passes outside of a display area of a viewing application such that the scripting language code stops receiving the information on the cursor position and stops moving the content in response. Moreover, the inventor has recognized and appreciated that the cursor "locking" functionality described above cannot be implemented using scripting language code disposed within a markup language document, due to security restrictions imposed on scripting language code by viewing applications that prevent such fixing of the position of the cursor by scripting language code.

The inventor has therefore recognized and appreciated that while scripting language code may be used to move content of a markup language document within a display area of a viewing application, there are inherent disadvantages to doing so based on user movements of a cursor of a pointing device.

However, the inventor has also recognized and appreciated that despite these disadvantages, movement of a cursor of a pointing device may be an intuitive way to move content of a markup language document for some users and therefore could be advantageous if the disadvantages discussed above could be mitigated. The inventor has further recognized and appreciated that these disadvantages may be mitigated using one or more of several techniques for processing information relating to movements of a cursor of a pointing device within a display area of a viewing application.

Accordingly, discussed below are various embodiments of techniques for moving visible content elements of at least one markup language document within a display area in response to user input moving a cursor of a pointing device. In embodiments, in response to user input moving the cursor, visible content elements of the markup language document may be moved in a display area based at least in part on an amount by which a content area that includes the visible content elements extends outside of the display area. For example, a panning facility may determine an amount by which to shift visible content elements in the display area based at least in part on an amount by which a content area that includes the visible content elements extends beyond the display area. The panning facility may move the visible content elements in any suitable manner, including by instructing a viewing application to scroll content or by editing markup elements of the markup language document to change positions of the visible content elements within the display area.

As discussed below in more detail, in some embodiments the panning facility may move the visible content elements within the display area such that scrolling of the visible content elements can be completed while a cursor of a pointing device is still positioned over the display area. As discussed above, scripting language code of a markup language document may not receive information on a position of a cursor when the cursor is not positioned over the display area. Accordingly, in some embodiments, to ensure that the visible content elements are moved appropriately in response to movements of the cursor, the panning facility may move the visible content elements such that movements are completed before a cursor exits a display area. For example, as a cursor moves toward a first side of a display area, the panning facility may move visible content toward a second side of the display area, opposite the first side, such that by a time that the cursor is moved fully to the first side of the display area, an edge of a content area on the first side aligns with an edge of the display area. Various techniques that may be implemented, and factors that may be evaluated in connection with those techniques, are described in detail below.

For ease of description below, many of the examples will be given in the context of a single markup language document that is processed by a viewing application and for which visible content elements are displayed in a display area of the viewing application. It should be appreciated, however, that multiple markup language documents may be associated with one another and together describe visible content elements to be displayed in a display area of a viewing application, such that the viewing application may process the markup language documents together to display the visible content elements. As a specific example, a web page may be described by multiple markup documents, which may include one or more HTML documents and one or more CSS documents, among other markup documents or other files referenced by the markup language documents. The multiple documents of the web page may refer to one another or one (or more) of the documents may refer to the other documents. Accordingly, it should be appreciated that embodiments are not limited to evaluating one markup language document and any of the techniques described below (unless indicated otherwise) may be applied to multiple markup language documents, such as documents that are associated and together describe a set of visible content elements to be displayed in a display area of a viewing application.

FIGS. 1A and 1B illustrate an example of an environment in which some techniques may be used. In the example of FIGS. 1A and 1B, a display area 100 displays content to a user. The display area 100 may be a portion of a user interface of a viewing application. The display area may be all of or a portion of an area of a display screen of a computing device. The viewing application may be any suitable application for rendering and displaying visible content elements of at least one markup language documents in accordance with the markup elements of those documents. The viewing application may be a web browser in some cases, and in these cases the display area may be a portion of the user interface of the web browser in which content of a web page is displayed (which may be the viewport of the web browser and/or may be different from other portions of the user interface, such as toolbars, status bars, etc.). The display area 100 may be displayed on any suitable type of display screen of any suitable type of device, as embodiments are not limited in this respect. Though, the techniques described herein may have particular advantages when used in connection with computing devices that are personal computers, such as desktop or laptop personal computers, rather than with mobile computing devices such as tablets or smartphones.

As shown in the examples of FIGS. 1A and 1B, a portion of a content area 102 of at least one markup language document overlaps with the display area 100. When the content area 102 (which is shown shaded in FIG. 1A) is displayed in a viewing application, visible content elements of the portion of the content area 102 that overlaps with the display area 100 are shown in the display area 100.

As should be appreciated from the foregoing, the at least one markup language document may be formatted in any suitable manner and include any suitable content, including any suitable visible content elements and markup elements in any suitable markup language. In some embodiments, the markup elements may be Hypertext Markup Language (HTML) and/or Cascading Style Sheet (CSS) markup elements and the content may be one or more files of a web page. Such one or more files of a web page that may be included as markup language documents may include files in any suitable format, including files that include HTML and/or files that include code (e.g., Active Server Pages (ASP), Java Server Pages (JSP), PHP Hypertext Preprocessor (PHP) code, or any other suitable code) that, when executed on a web server and/or a web browser of a client, output HTML elements or other markup elements. Such one or more files of a web page may additionally or alternatively include one or more style sheets, one or more files linked as defining content of a frame or otherwise referenced by an HTML file, or any other files that one of ordinary skill would appreciate could be included in a web page. Embodiments that operate with web pages are not limited to operating with any particular type of web page defined in any particular format, as embodiments may operate with any suitable web page.

Markup language documents like web pages may include visible content elements to be displayed to a user. Visible content elements may include any suitable content that may be displayed, including any suitable content that may be included in web pages or other markup language documents, as embodiments are not limited in this respect. Examples of visible content elements include blocks of text, images, tables, Adobe Flash objects, tables, forms, and other content. The content area 102 of the markup language document(s) is the area in which these visible content elements are positioned for review. Those of skill in the art will appreciate that, in some cases, a markup language document may include non-visible content elements that are positioned in a same manner as visible content elements, but are configured not to be displayed. As discussed in more detail below in connection with FIG. 4, in embodiments the content area 102 is identified as the area that includes only the visible content elements of the markup language document(s) and would not include any areas beyond that include only non-visible content elements.

As shown in the example of FIG. 1A, the content area 102 (shaded) extends beyond the display area 100 on one side of the display area 100. Using techniques described herein, as a user moves the cursor 104 of a pointing device, a panning facility may respond to the user's input by shifting a position of visible content elements and thereby shift a position of the content area 102 relative to the display area 100. For example, as the cursor 104 approaches side 106 of the display area 100, a panning facility may move visible content elements away from the side 106, toward another side opposite the side 106. By doing so, the visible content elements that extend outside of the display area 100 may be brought into the display area 100 to be viewed by a user. As a result of the moving, other visible content elements (such as visible content elements on the other side of the content area 102) may be moved out of the display area 100 and moved out of view.

The inventor has recognized and appreciated that some users may find it disadvantageous to have a content area 102 move in response to any and all movements of the cursor 104. Accordingly, in some embodiments, a panning facility may move visible content elements of the markup language documents in response to detecting movements of the cursor 104 inside one or more specific regions of the display area 102. FIG. 1A illustrates a margin 108 adjacent to the side 106 that may be used to trigger movement of the visible content elements. In the example of FIG. 1A, as the cursor 104 moves within the margin 108, a panning facility may detect an amount of horizontal movement of the cursor 104 and move the visible content elements accordingly.

FIG. 1B illustrates an example of movement of the visible content elements in response to user movement of the cursor 104. The example of FIG. 1B illustrates the movement of the content area 102 of FIG. 1A responsive to movements of the cursor 104. Specifically, as the cursor 104 moves rightward in the margin 108 toward the side 106, the panning facility shifts the visible content elements leftward in the display area 100 such that the content area 102 extends beyond the left-side edge of the display area 100. When the content area 102 extends off the left-side edge of the display area 100, a second margin 108B may be created. When the panning facility detects movements of the cursor 104 in the margin 108B, the panning facility may respond by moving visible content elements rightward toward the side 106.

As should be appreciated from the foregoing, in some embodiments a panning facility may move the content area 102 in response to movements of the cursor 104 such that a content area 102 is completely moved into the display area 100 before the cursor 104 exits the display area 102. This is because, as discussed above, in some computing devices and for some viewing applications, a panning facility may not receive information regarding movements of the cursor 104 once the cursor 104 has exited the display area 100. For example, if the cursor 104 is moved toward the side 106 of the display area 100 and then outside of the display area 100 (e.g., when the display area 100 is only a window shown within a larger display screen), then the viewing application of which the display area 100 is a part may not receive information on movements of the cursor 104 once the cursor 104 has passed the side 106. At this point, therefore, the content area 102 would no longer move in response to movements of the cursor 104, which a user may find confusing or frustrating. Embodiments described herein may attempt to mitigate this issue by ensuring that when the cursor 104 is being moved across the margin 108 and toward the side 106, the panning facility moves the content area 102 such that the side 106B of the content area is aligned with the side 106 of the display area 102, or disposed inside the display area 100, at the time that or before the cursor 104 is positioned at the side 106. As used herein, when the side 106B is aligned with the side 106, the side 106B may be precisely positioned at the side 106 and/or may be positioned proximate to the side 106 such that there is only a trivial difference in the positions that would not affect display of visible content elements in a way that would be noticeable to a common user.

As should be appreciated from the foregoing, a panning facility may implement a number of different techniques and evaluate a number of different factors in identifying an amount by which to move visible content elements in response to detecting movement of a cursor of a pointing device. Examples of techniques that may be used to consider various factors are discussed below in connection with FIGS. 2-5.

Figure 2:
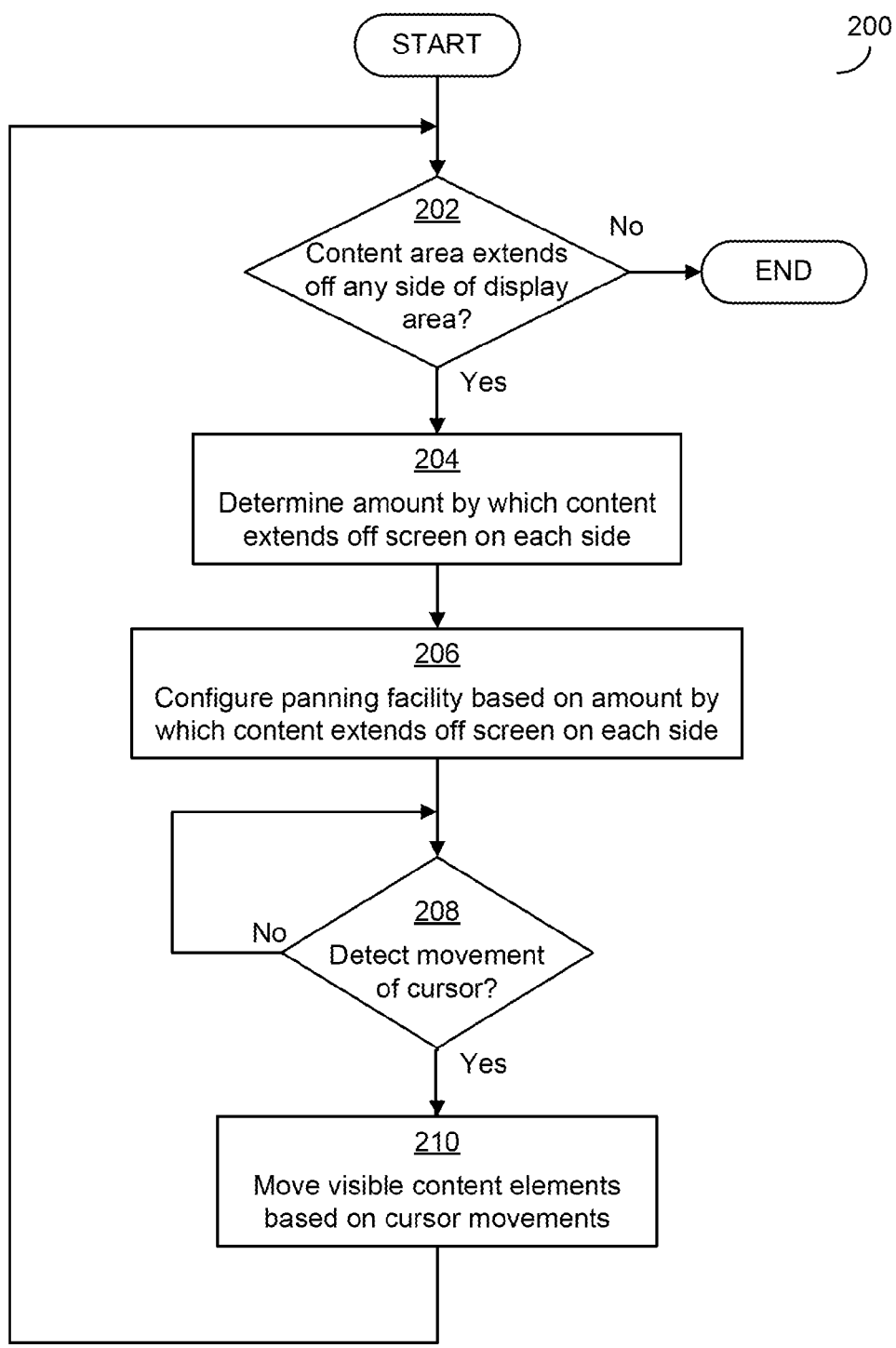
FIG. 2 is a flowchart of an exemplary process by which a panning facility may move visible content elements of a markup language document responsive to movements of a cursor of a pointing device.

FIG. 2 illustrates an overall process 200 that may be used in some embodiments to move visible content elements of at least one markup language document based at least in part on an amount by which a content area extends outside of a display area and in response to movements of a cursor of a pointing device. The process 200 may be carried out by a panning facility. The panning facility may, in some embodiments, be incorporated into one or more markup language documents, such as one or more markup language documents that together make up a web page. The panning facility may be implemented in any suitable manner, including via scripting language code (e.g., JavaScript code) that is incorporated into the markup language document, such as by the code being disposed within the markup language document and/or the code being referenced by one or more markup elements included in the markup language document. The panning facility may have been incorporated into the markup language document in any suitable manner, as embodiments are not limited in this respect. In examples discussed below, one or more developers that created the markup language documents (e.g., a web developer, such as a human web developer) may have inserted the panning facility into the markup language document. As another example, an insertion facility may have edited the markup language document to insert the panning facility. Examples of ways in which an insertion facility may be implemented are discussed below in connection with FIG. 7.

Prior to the start of the process 200, the one or more markup language documents may be loaded by a viewing application and/or processed to display visible content elements of the markup language document in a display area of the viewing application. As discussed above, in cases in which the markup language document implement a web page, the viewing application may be a web browser. The web browser may, in response to a request from a user, download the markup language document of the web page from one or more web servers and process the document. As part of processing the document, the web browser may execute the scripting language code incorporated into the document and may render visible content elements described by the markup elements of the document for display via a display area (e.g., a viewport) of the web browser. The web browser, or other viewing application, may load and execute the panning facility in any suitable manner, including using known techniques, as embodiments are not limited in this respect. The panning facility may begin operation at any time, such as when the viewing application has processed the markup elements of the markup language document and identified a layout of content elements in a content area prior to display of the visible content elements, or following display of the visible content elements at any suitable time.

The process 200 begins in block 202, in which the panning facility determines whether a content area of the markup language document extends off any side of the display area of the viewing application. As discussed briefly above and in more detail below, the content area of the markup language document is an area, such as a rectangular area, within which are disposed all of the visible content elements of the markup language documents. Due to a discrepancy between a size of the content area and a size of the display area, such as a discrepancy in widths, the content area may extend beyond any one of the four sides of the display area. If the panning facility determines in block 202 that the content area does not extend beyond the display area on any side, then the process 200 ends.

If, however, the panning facility determines in block 202 that the content area extends beyond the display area on any side, then the facility in block 204 determines an amount by which the content area extends beyond the display area on each of those one or more sides. The amount may be calculated as any suitable number, including as a distance in any suitable coordinate system. In some embodiments, the amount may be calculated as a distance in a document coordinate system. The distance may be a number in pixels, which may be virtual pixels of the document as opposed to physical pixels of a display screen. In other embodiments, the amount may be determined as a relative amount, such as an amount relative to an amount of the content area that is disposed within the display area or an amount relative to the display area. For example, the relative amount may be a fraction or percentage, such as that 25 percent of the content area extends beyond a side of the page.

In block 206, the panning facility configures itself to move visible content elements of the markup language document, which are included in the content area, based on the amount that was determined in block 204. The panning facility may perform the configuration of block 206 in any suitable manner, including according to examples discussed in detail below in connection with FIGS. 5-6.

Following the configuration of block 206, the panning facility in block 208 monitors for movements of a cursor of a pointing device. The panning facility continually checks for movement of the cursor and, if no movement is detected, continues monitoring for movement. If, however, a movement of the cursor is detected, then in block 210 the panning facility moves visible content elements of the markup language document based on the movement of the cursor. The visible content elements may be moved in any suitable manner, as embodiments are not limited in this respect. Examples of ways in which the visible content elements may be moved are described in greater detail below, including in connection with FIGS. 5-6.

Once the visible content elements are moved in block 210 based on the cursor movement, the panning facility loops back to block 202 to determine, following the movement, whether the content area extends beyond a side of the display screen and, if so, determine the new amount by which it extends in block 204. The process 200 may repeat in this manner as the cursor moves and the visible content elements move.

As should be appreciated from the discussion of FIG. 2 above, techniques described herein may be used to move visible content elements when the visible content elements extend off a display area on any side of that display area, including both right and left sides of a display area and top and bottom sides. Accordingly, the techniques described herein may be used similarly to horizontal or vertical scrolling of content. However, the inventor has recognized and appreciated that existing vertical scrolling techniques may be more easily understood and used by some users than existing horizontal scrolling techniques. The inventor has further recognized and appreciated that, in view of the understanding of these existing techniques, it may be advantageous in some embodiments to use existing vertical scrolling techniques for moving content up and down relative to a display area but combine these existing vertical scrolling techniques with the techniques described herein such that techniques described herein are used for moving content rightward and leftward in response to movements of a cursor of a pointing device and based at least in part on an amount by which content extends off a side of a display area. Accordingly, in some embodiments the techniques described herein may be used for moving visible content elements when a content area extends off a left and/or right side of a display area, but not when the visible content elements extend off a top or bottom side.

In the discussion of FIG. 2 above, the determination of block 202 of whether a content area extended beyond a display area was described as a first step in the process that is performed at any time. In some embodiments, such a determination may be a first step and may be performed when a markup language document is loaded and a panning facility that is incorporated into that document is executed. In other embodiments, however, the determination of block 202 may be triggered by occurrence of another action relative to the markup language document, which may be at any time following display of visible content elements of the markup language document. Any suitable action may trigger the determination, as embodiments are not limited in this respect. In some embodiments, the action(s) that may trigger the determination may be actions that could cause a content area of a markup language document to change in size. For example, if a content area is modified to be narrowed or widened, the modification may lead to a content area extending beyond a display area or no longer extending beyond a display area. Accordingly, a modification of a dimension of the content area may trigger the determination of block 202.

Figure 3:
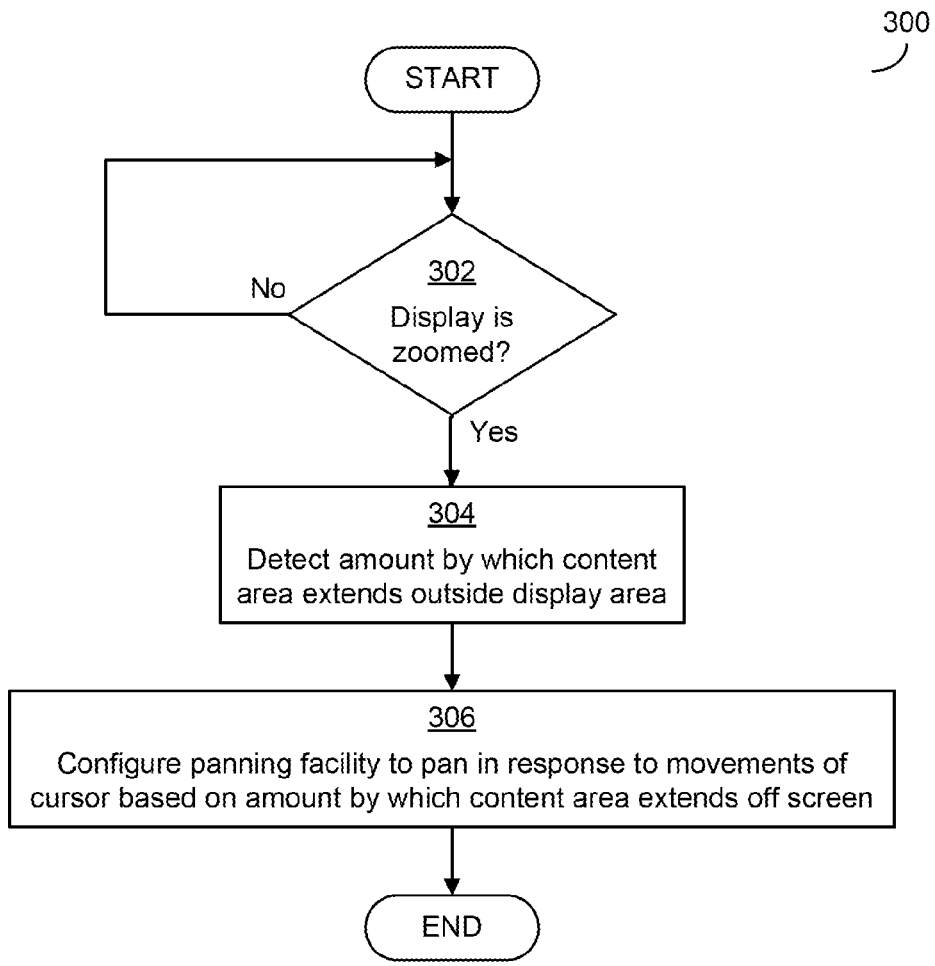
FIG. 3 is a flowchart of an exemplary process by which a panning facility may trigger a determination of whether a content area of a markup language document extends beyond a display area.

FIG. 3 illustrates an example of a process 300 that a panning facility may implement to trigger a determination of whether a content area extends beyond a display area. Similar to the process 200 of FIG. 2, prior to the start of the process 300, one or more markup language documents may be loaded by a viewing application and/or processed to display visible content elements of the markup language document in a display area of the viewing application. As part of processing the document, the viewing application may execute the scripting language code incorporated into the document and may render visible content elements described by the markup elements of the document for display via a display area (e.g., a viewport) of the viewing application. As should be appreciated from the foregoing, the viewing application may be a web browser and the one or more markup language documents may together make up a web page.

The process 300 of FIG. 3 begins in block 302, in which the panning facility monitors to determine whether a display has been "zoomed," also known as magnified. The panning facility may monitor for zooming or magnification using any suitable technique, including techniques for zooming/magnification that are a part of viewing applications or a part of an operating system or other software executing on a computing device on which the panning facility is executing. The panning facility may additionally or alternatively monitor for application of zooming techniques implemented in scripting language code incorporated into the one or more markup language documents into which the panning facility is also incorporated. For example, in some embodiments the panning facility may monitor for application of zooming techniques described in U.S. patent application Ser. No. 14/569,499 filed on Dec. 12, 2014, the contents of which are incorporated herein by reference in their entirety and at least for its discussion of techniques for magnifying content of markup language documents. As another example, the panning facility may monitor for whether a width of a "body" element of the markup language document has changed, such as whether the width has increased. The panning facility may determine this in any suitable manner, including through periodically accessing information on a "body" element stored by the viewing application. The information may be stored, for example, in a data structure storing information on elements, such as the Document Object Model (DOM) data structure described below in connection with FIG. 4.

The panning facility may monitor in any suitable manner, including by monitoring for a change in a variable or by monitoring for a communication received from the facility performing the magnification (which may be implemented in scripting language code or not). If the panning facility determines in block 302 that the display has not been zoomed, then the panning facility continues monitoring in block 302. If, however, the panning facility determines in block 304 that the display has been zoomed, then in block 304 the panning facility determines an amount by which a content area, including visible content elements of the markup language documents, extends outside a display area. The determination of block 304 may be made in any suitable manner, including according to techniques discussed above in connection with blocks 202 and 204 of FIG. 2, and according to techniques discussed in greater detail below. Once the amount by which the content area extends off screen is determined in block 304, then in block 306 the panning facility configures itself to move content in response to movements of a cursor, based at least in part on an amount by which the content area extends outside of a display area. The configuration of block 306 may be performed in any suitable manner, including via techniques discussed above in connection with block 206 of FIG. 2 and discussed in more detail below in connection with FIGS. 5-6.

Following the configuration of block 306, the process 300 ends. As a result of the process 300, the panning facility has responded to magnification of web content by enabling panning of a content area responsive to movements of a cursor of a pointing device.

In the examples discussed above, a panning facility identifies a content area of a set of one or more markup language documents (e.g., the document of a web page) and determines an amount by which the content area extends past a display area on the left and right sides of the display area, and/or the top and bottom sides of the display area. As should be appreciated from the foregoing, the content area of the markup language document is identified, in part, such that when the panning facility moves the content area, in response to movements of a cursor of a pointing device, an edge of a content area can be moved to align with or pass an edge of a display area before the cursor is moved beyond an edge of the display area. As discussed above, it may be advantageous for the panning facility to move the content area in this way because, with some viewing applications, once the cursor moves past an edge of the display area the panning facility will no longer receive information regarding movements of the cursor.

Figure 4:
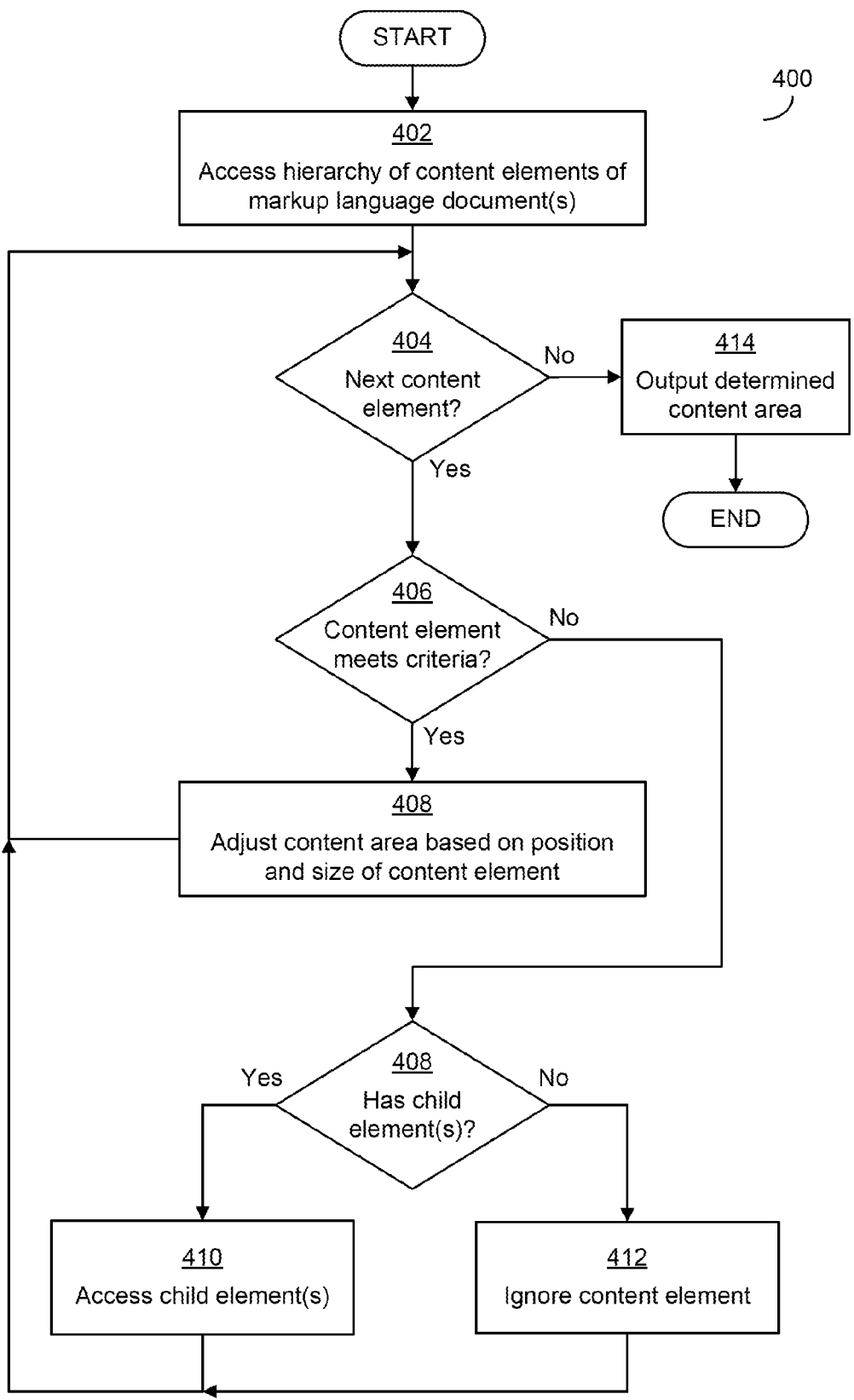
FIG. 4 is a flowchart of an exemplary process by which a panning facility may determine a content area of a markup language document.

It should be appreciated that embodiments are not limited to identifying a content area in any particular manner. FIG. 4 gives an example of one technique that may be used for identifying a content area, but other techniques may be used.

Prior to the start of the process 400, one or more markup language documents (e.g., that together make up a web page) may be retrieved by a viewing application and processed as part of rendering and/or displaying visible content elements via a user interface of the viewing application. As part of the processing, the viewing application may execute a panning facility. Additionally, in some embodiments, the process 400 may be triggered by a determination that content has been magnified/zoomed, as discussed above in connection with FIG. 3.

The process 400 begins in block 402, in which the panning facility accesses a data structure of elements of the markup language document. The data structure may be any suitable data structure describing elements identified and/or described by markup elements of a markup language document. As an example, elements described by a markup language document may be arranged hierarchically, with some elements disposed within other elements (e.g., a text element disposed within a table element, when the text is to be displayed within the table). The viewing application may maintain information on elements of a markup language document in a data structure having a corresponding hierarchy. An example of such a data structure is the Document Object Model (DOM) that is maintained for elements of a web site by a web browser. The panning facility may then begin processing each element of the markup language document as identified by the data structure, examining different elements identified by the data structure to determine positions and sizes of individual elements and, from those, the dimensions of a content area of the markup language document that encompasses each of the visible content elements of that document.

The panning facility processes the hierarchy of content elements using a loop that begins in block 404. In block 404, the panning facility selects a next, as-yet-unexamined content element from among the content elements at the level of the hierarchy currently being examined. From there, the panning facility performs a depth-first search of the hierarchy, examining each of the elements. More specifically, in block 404 the panning facility determines if there is a next content element to be examined, which it determines by first evaluating whether there is a next content element at the current level of the hierarchy and, if not, by evaluating whether there is a next content element at one or more higher levels of the hierarchy. When a next content element exists, it is selected and evaluated in block 406.

In block 406, the panning facility determines whether the currently-selected content element (which may not be a visible content element) meets one or more criteria. The criteria that are evaluated may serve to identify content elements that are visible content elements and that may be elements that may affect the dimensions of the content area. For example, the evaluation of block 406 may include determining whether the currently-selected content element is visible (rather than being configured as invisible) and is colored differently from a background of the markup language document. The evaluation of block 406 may also include determining whether the content element is a container of other elements and, if so, whether the container is configured to center the display of those other elements. Such container elements are unlikely to affect the dimensions of the content area and, as such, the panning facility in block 406 is looking for elements that are not containers that center display of elements. As another example, the evaluation of block 406 may include determining whether content elements have more than a threshold width (e.g., 4 pixels). As another example, the evaluation of block 406 may include determining whether the position of the left side of the element is not at the left side of the display area (e.g., the X-position of the left side of the element is not zero). Elements with a left side that is disposed exactly at the left side of the display area are often containers for other elements and it may be more efficient to review the elements within the container rather than the container itself.

If the currently-selected element satisfies the criteria of block 406, then in block 408 the panning facility adjusts the content area based on a position and size of the content elements. The panning facility may, for example, compare the position and size of the currently-selected content element to the current dimensions of the content area (which may begin as zero dimensions and expand as content elements are evaluated) to determine whether any portion of the content element falls outside the content area. If any portion of the content element falls outside the content area, the content area is expanded. The content area may be expanded as a rectangle that includes all parts of all content elements satisfying the criteria of block 406. If the currently-selected content element falls within the current dimensions of the content area, the content area is not adjusted in block 408 based on that content element. Once the content area is adjusted if necessary, the panning facility loops back to block 404 to select a next content element, if there remain any unexamined content elements.

If, however, in block 406 the panning facility determines that the currently-selected element does not satisfy the criteria of block 406, then the panning facility determines in block 410 whether the currently-selected content element has any "child" elements in the hierarchy, which are elements disposed at a level of the hierarchy below the currently-selected content element and linked to the currently-selected content element in the hierarchy. If so, then in block 412 the panning facility moves to the lower level of the hierarchy and loops back to block 404, where the next content element at the current level of the hierarchy (which, as a result of block 412 is the lower level of the hierarchy) is selected. If, however, the panning facility determines in block 410 that the currently-selected element does not have any child elements, then the panning facility in block 414 ignores the currently-selected content element and takes no action, then loops back to block 404 to select a next content element as described above.

As should be appreciated from the foregoing description of block 404, the panning facility will continue evaluating content elements in the depth-first approach until no more content elements remain to be evaluated. At that time, the panning facility will determine, in block 404, that there is no next content element that may be selected. The panning facility will then, in block 414, output the determined content area. The determined content area may be output in any suitable manner, including by storing the determined content area in a variable of the panning facility or otherwise storing the determined content area. The process 400 then ends. As a result of the process 400, the panning facility is aware of dimensions of the content area, which may include a total area (e.g., in pixels) of the content area and may use the content area in various ways, including to determine whether the content area extends beyond a display area.

As discussed above in connection with FIG. 2, the configuration of a panning facility and the moving by a panning facility, in response to user input moving a cursor of a pointing device, of visible content elements of a markup language document, may be performed in various ways. Examples of techniques that may be implemented in some embodiments are described below in connection with FIG. 5-6.

In some embodiments, a panning facility may move visible content elements of a markup language document in response to any movements of a cursor of a pointing device. In other embodiments, however, a panning facility may move the visible content elements in response to movements of the cursor that only meet a criteria. For example, the panning facility may determine whether the cursor is within a specific portion of a display area, or one of multiple specific portions, and only move the visible content elements if so. As a specific example, in some embodiments the panning facility may establish margins in a display area, such as margins adjacent to edges of the display area, and move the visible content elements in response to the user moving the cursor within the margins. For example, in response to the user moving the cursor within a margin adjacent to a first edge of the display area (e.g., the right-side edge), the panning facility may move the visible content elements in a direction away from that first edge, toward an opposite edge of the display area (e.g., the left-side edge).

Figure 5:
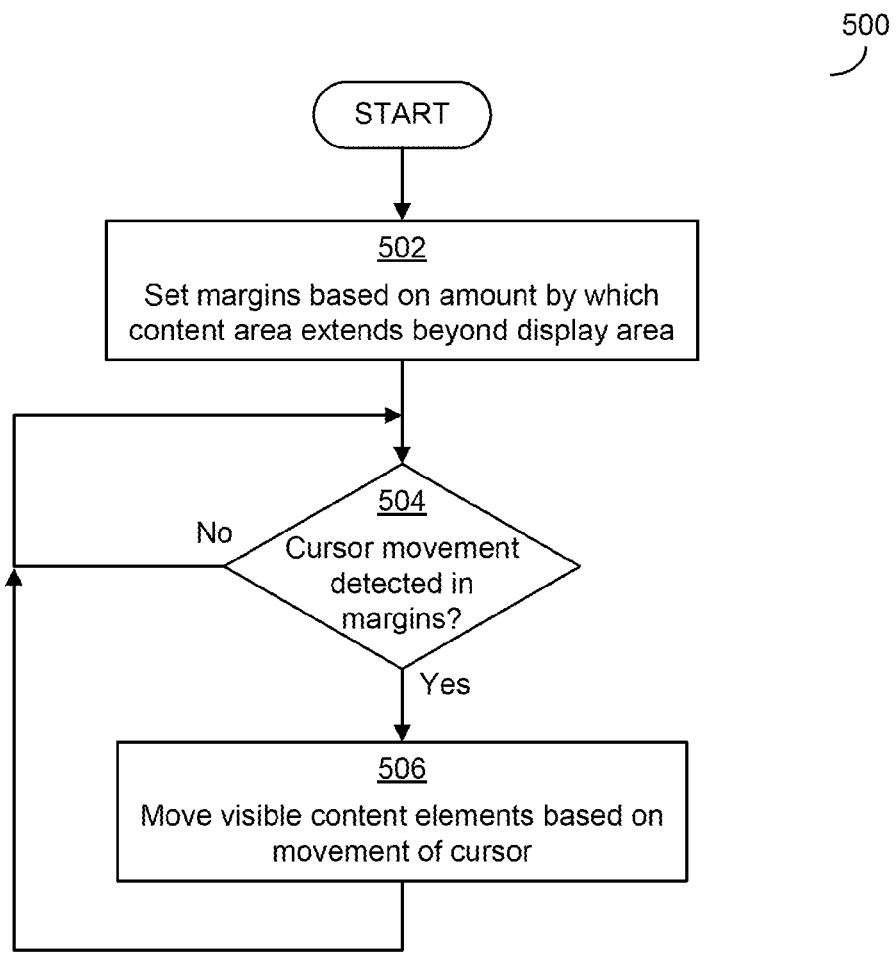
FIG. 5 is a flowchart of an exemplary process by which a panning facility may configure and use margins of a display area to move visible content elements of a markup language document responsive to movements of a cursor.

FIG. 5 illustrates an example of a process that a panning facility may implement in some embodiments that operate with margins. The process 500 of FIG. 5 may, in some such embodiments, be implemented as part of a larger process like the process 200 of FIG. 2, such as by being implemented as part of the operations of blocks 204-210 of FIG. 2. Accordingly, prior to the start of the process 500, the panning facility determines that the content area of the markup language document extends beyond at least one edge of the display area and determines an amount (e.g., in pixels) by which the content area extends beyond each edge of the display area. For ease of explanation, the process 500 will be described below in connection with one side of the display area, but it should be appreciated that the steps described below may be repeated for each of one or more other sides of the display area.

The process 500 begins in block 502, in which the panning facility sets one or more dimensions of a margin on the edge of the display area beyond which the content area extends based on an amount by which the content area extends past the edge of the display area. As should be appreciated from the discussion above, in some embodiments the panning facility may move the visible content elements of a markup language document responsive to movements of a cursor such that by a time that the cursor moves to an edge of the display area, the content area has been moved to align with the display area. In some embodiments, to assist with meeting this goal, the panning facility adjusts dimensions of the margin such that, as an amount by which the content area extends past the display area increases, the size of the margin increases. By increasing the margin, there is a larger area in which the panning facility tracks movements of the cursor of the pointing device and a higher likelihood that the panning facility will successfully be able to move the content area such that an edge of the content area aligns with an edge of the display area by a time that the cursor reaches the edge of the display area.

The dimensions that are set in block 502 may include any suitable dimension, including a width and/or a height. In some embodiments, a margin may be a rectangle that stretches along an entirety of edge of the display area and extends into the display area, toward a center of the display area, by some amount. For simplicity, the dimension of such a rectangle that extends towards the center of the display area will be referred to below as the "width" of the margin.

In such a case that the margin is rectangular and stretches along the entirety of the edge of the display area, the panning facility may adjust a width of the margin based in part on an amount by which the content area extends beyond the edge. For example, as the content area extends beyond the edge by greater amounts, the panning facility may increase the width of the margin.

In some embodiments, for example, the panning facility may determine a ratio of a width of a content area to a width of a display area. For example, if the content area is 20 percent wider than the display area, the panning facility may calculate a ratio of 1.2. The panning facility may then use this ratio in calculating a width for the margins on either side of a display area. For example, the panning facility may divide the ratio in two, then subtract a value to account for an area in the middle of the display area that will not include the margins, to arrive at a percentage width of the display area that will be used to calculate a pixel width of the margins. To continue the specific example of a ratio of 1.2, the panning facility may, in one embodiment, divide the ratio in 2 and subtract 0.55, to yield a value of 0.05, or 5 percent. In this case, the panning facility may set a margin width to be a number of pixels equal to 5 percent of the width of the display area. In some such embodiments, the panning facility may also use a maximum and minimum width, such that the margins are not less than 10 percent of the width of the display area or more than 25 percent.

In other embodiments, the panning facility may maintain a default width of a margin, which may be expressed as an absolute number (e.g., in pixels) or a relative number (e.g., a percentage). For example, in a case where the default width is expressed as a relative number, it may be a number that is relative to a dimension (e.g., a width) of the display area, such as that the default width is 15 percent of the width of the display area. The panning facility may then adjust this default width to be wider or narrower based on the amount by which the content area extends beyond the edge of the display area. For example, the panning facility may determine if the content area extends more than a first threshold amount (e.g., in pixels) beyond the edge of the display area and if so, increase the default width based on the calculated difference (e.g., in pixels) between the amount by which the content area extends beyond the edge and the first threshold amount. As another example, the panning facility may determine if the content area extends less than a second threshold amount (e.g., in pixels) beyond the edge of the display area and if so, decrease the default width based on the calculated difference (e.g., in pixels) between the second threshold amount and the amount by which the content area extends beyond the edge. In the case that the panning facility adjusts the default width to be greater or smaller, in some embodiments the panning facility may also have a maximum width and a minimum width. In such embodiments, the panning facility does not set the width of the margin to an amount larger than the maximum or less than the minimum.

The panning facility may set the dimensions in block 502 in any suitable manner. The way in which the panning facility sets the dimensions in block 502 may be based on the manner in which the panning facility detects movements of a cursor and responds by moving visible content elements. In some embodiments, for example, the panning facility may edit the markup language document to insert markup elements for one or more invisible elements, such as invisible container elements. In such a case, the panning facility may specify that the invisible elements should have positions that are fixed to the edges of the display area, and may also specify in the inserted markup elements the dimensions calculated in block 502. Subsequently, the panning facility may monitor movements of a cursor only when the cursor is disposed over the invisible elements. In other cases, however, the panning facility may monitor all movements of a cursor when the cursor is disposed over the content area to determine whether the movements satisfy criteria for moving the content area (and the visible content elements) responsive to the cursor movements. In this case, the panning facility may, as part of evaluating the criteria, evaluate a position of the cursor. If the panning facility determines that the position of the cursor falls within a portion of the display area that is encompassed by the dimensions of the margin determined in block 502, then the panning facility may respond to the movements of the cursor by moving visible content elements.

Once the dimension(s) of the margin are set in block 502, then in block 504 the panning facility begins monitoring for movement of a cursor within the margin. In some embodiments, the panning facility may monitor for any movement of the cursor within the margin and respond accordingly. In other embodiments, however, the panning facility may monitor in block 504 for only movements in the margin toward an edge of the display area to which the margin is adjacent. For example, for a right-side margin, the panning facility may monitor only for movements of the cursor toward a right edge of the display area, while for a left-side margin the panning facility may only monitor for movements of the cursor toward a ledge edge of the display area.

To obtain the information on movements of the cursor, the panning facility may request that information regarding movements of the cursor be provided to the panning facility. The request may be carried out in any suitable manner, including using known techniques for requesting, and receiving, information regarding movements of a cursor from a viewing application (e.g., web browser). The panning facility may monitor the movements of the cursor in any suitable manner to determine whether the cursor is moving within a margin, including according to examples discussed immediately above.

If the panning facility does not detect a movement of the cursor in the margin in block 504, the panning facility loops back and continues monitoring. If, however, the panning facility determines in block 504 that the user has moved the cursor within the margin, then in block 506 the panning facility moves visible content elements of the markup language document in response to the movement of the cursor. The panning facility may move the visible content elements in any suitable manner, including using techniques described below in connection with FIG. 6. In some embodiments, the panning facility may move the visible content elements by executing a scripting language command instructing a viewing application to scroll content, or by editing one or more markup elements of the markup language document, which may include modifying existing markup elements and/or inserting new markup elements. Editing the markup elements may include editing the markup elements to specify a new position, or a change in position, for one or more of the visible markup elements individually or collectively. The panning facility may move the visible content elements in any suitable direction(s) responsive to the movements of the cursor. For example, the panning facility may move the visible content elements away from the edge of the display area to which to the margin is adjacent, toward a center of the display area (e.g., move the elements leftward in response to movement in a right-side margin), in response to the movements of the cursor in the margin.

Once the panning facility has moved the visible content elements of the markup language document in block 506, the panning facility loops back to block 504 to continue to monitor for movements of the cursor within the margin.

As mentioned above prior to the discussion of the process 500, for ease of explanation the process 500 was discussed in connection with only one margin on one side of the display area, but the process 500 may be used in connection with multiple margins on multiple sides of the display area. It should be appreciated, then, that in some embodiments the panning facility may implement a process, similar to the process 500, to move the visible content elements in multiple directions responsive to the moving of the cursor in each of multiple margins. For example, the panning facility may move the visible content elements in one direction responsive to movements of the cursor in a margin at one time and in another direction responsive to movements of the cursor in a different margin at a later time. As another example, the panning facility may detect movements of the cursor in two margins at a same time (e.g., a movement in an overlapping region of a bottom margin and a right-side margin) and move the visible content elements in multiple directions (e.g., up and to the left) in response to movement in both margins at the same time. However, as discussed above, in other embodiments the panning facility may only move visible content elements in horizontal directions and not vertical directions.

In addition, while an example was given of a process in which the margins are sized dynamically based on an amount by which the content area extends beyond a display area, it should be appreciated that in some embodiments margins of fixed dimensions may be used.

Figure 6:
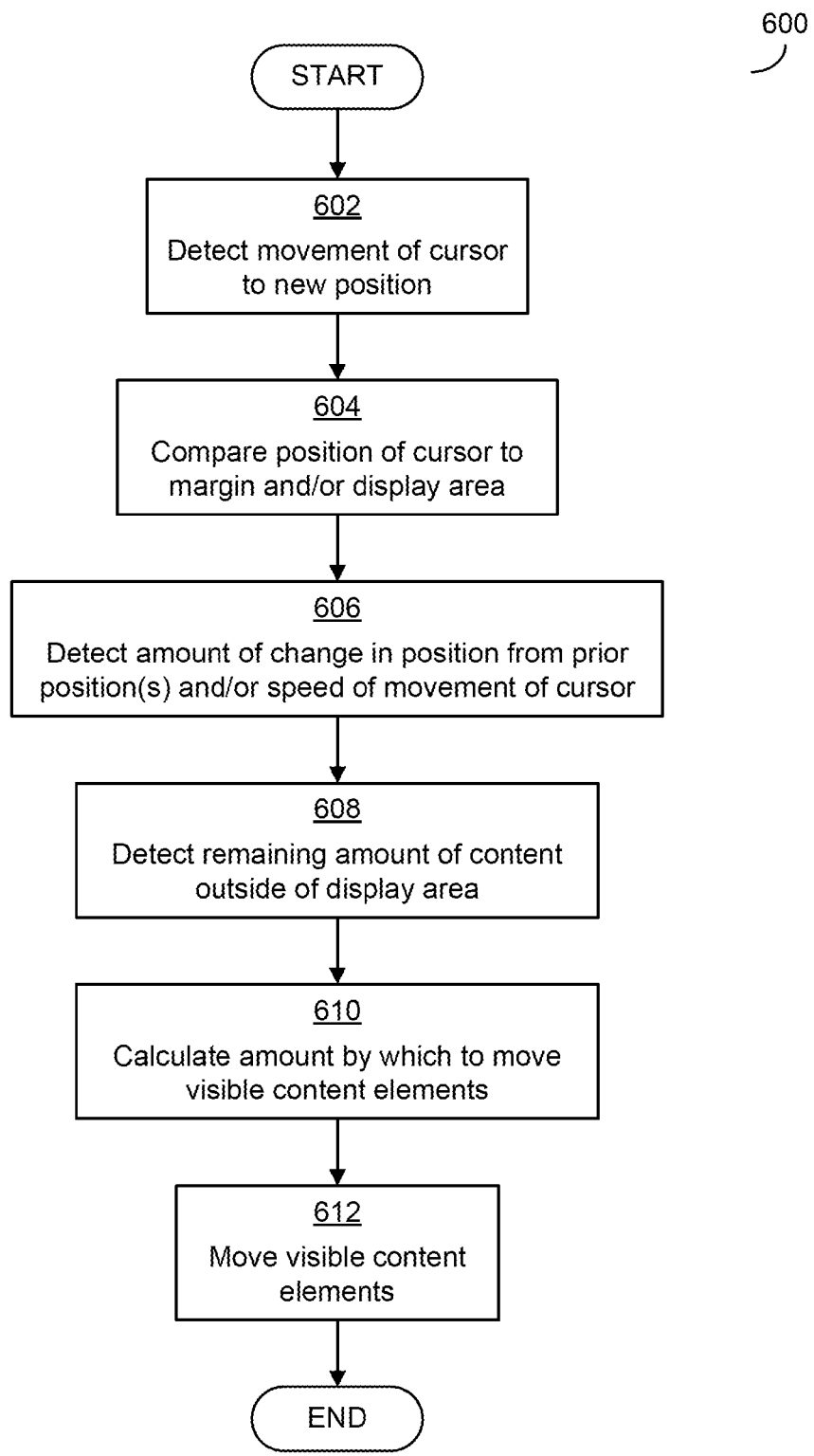
FIG. 6 is a flowchart of an exemplary process by which a panning facility may move visible content elements of a markup language document responsive to movements of a cursor.

FIG. 6 illustrates an example of a process by which the panning facility may move visible content elements of a markup language document responsive to movements of a cursor of a pointing device. It should be appreciated, however, that embodiments are not limited to operating in the manner described in connection with FIG. 6, as other embodiments are possible.

Prior to the start of the process 600 of FIG. 6, the panning facility determines that user input has moved a cursor of a pointing device in a manner to which the panning facility should respond by moving visible content elements within a display area. For example, the panning facility may have determined that the movement of the cursor met one or more criteria, such as that the movement was within a margin of the display area. In response to determining that the visible content elements are to be moved in response to the movement of the cursor, the panning facility may perform the process 600 of FIG. 6.

The process 600 begins in block 602, in which the panning facility detects that user input has moved the cursor to new position. The movement of the cursor may be detected in block 602 in any suitable manner, including by receiving the information from a viewing application (e.g., web browser), in response to a request from the panning facility to be informed of movements of the cursor in the display area. For example, in a case that the viewing application is a web browser, the panning facility may request information on movements of the cursor through accessing a DOM property such as "movementX." In block 602, the panning facility may receive information about the movement of the cursor, which may include a new position to which the user input has moved the cursor.

In block 604, the panning facility compares the new position of the cursor to a margin and/or display area to determine a proximity of the cursor to an edge of the display area and/or an edge of the margin. The comparison of block 604 may include determining a relative position indicating an amount of display area or margin that separates the new position of the cursor from the display area (e.g., the cursor is separated from the edge by 10 percent of the display area, or 10 percent of the margin), or a relative position indicating an amount of margin or display area that has been traversed by the cursor (e.g., the cursor's new position is 25 percent across the width of the margin). This information may be useful to the panning facility in determining a remaining amount of display area or margin in which the panning facility is able to detect movement of the cursor. The panning facility may shift the visible content elements based on the remaining amount, such as by calculating a total shift from a starting position (i.e., a total of the current movement plus any previous movements of the visible content elements) to be proportional to the amount of margin and/or display area traversed by the cursor. As another example, in some embodiments, as the remaining area decreases, the panning facility may increase an amount by which the visible content elements are moved based on proximity to the edge of the margin and/or display area. The panning facility may increase the amount in any suitable manner. For example, the panning facility may, in calculating a movement amount in block 610 below, multiply a calculated movement amount by a factor based on proximity to the edge of the margin and/or display area. Doing so may aid in ensuring that an edge of the content area aligns with an edge of the display area at least before or at a time that the cursor is positioned at an edge of the display area.

In block 606, the panning facility detects an amount of change in position and/or a speed of movement of the cursor. To do so, the panning facility may store a prior position of the cursor, which the panning facility may update as the cursor moves. The panning facility may compare the information received in block 602 regarding a new position of the cursor to the stored information regarding the prior position of the cursor to determine the change in position. The change in position may be calculated for any suitable direction. In some embodiments, the change in position may be calculated for one or both axial directions separately, such as the x-direction and/or y-direction. In other embodiments, the change in position may be calculated for any suitable direction, such as by calculating the length of a line connecting the prior position from the new position. In embodiments in which the speed is calculated, time information may also be used. The time information may be explicit time information, such as embodiments in which information on a current time is received in block 602 or determined separately by the panning facility, and may be stored by the panning facility for a prior position. In other cases, however, the time information may be implicit time information, such as a case in which the panning facility receives only position information in block 602 but receives that position information at fixed time intervals. The change in position and/or speed information that is calculated in block 606 may be used by the panning facility in calculating an amount by which to move the visible content elements. For example, as the cursor moves by larger amounts or more quickly toward an edge of the display area, the panning facility may increase an amount by which the visible content elements are shifted. This may be done to ensure that, even if the cursor is moving rapidly toward the edge of the display area, the panning facility is still able to move the visible content elements such that an edge of the content area aligns with an edge of the display area before or at the time the cursor reaches the edge of the display area.

In block 608, the panning facility may also determine an amount of content area that extends outside of the display area at the time the cursor is moved. The panning facility may do this because, if the content area no longer extends beyond the display area at the time the cursor is moved, the panning facility may not move the content area, despite that the movement of the cursor meets criteria (e.g., the cursor is moved in the margin). The panning facility may also do this because, if the content area extends a large amount beyond the edge of the display area at the time the cursor is moved, the panning facility may move the content by a larger amount to ensure that an edge of the content area reaches an edge of the display area by a time that the cursor reaches an edge of the display area.

In block 610, the panning facility uses any or all of the information collected in blocks 602-608 to calculate an amount by which to move the visible content elements. The panning facility may first determine, based on the information collected in block 608, whether the content area still extends by any amount past an edge of the display area. If not, the panning facility may set the movement amount to 0, such that the visible content elements are not moved in response to the cursor movements. If, however, the content area extends beyond the display area, the panning facility may calculates a movement amount (e.g., in pixels), which it may do in any suitable manner. In some embodiments, the panning facility is configured with a default movement amount that the panning facility may then adjust based on the collected information. For example, the panning facility may increase the default amount as discussed above, such as increasing the movement amount as the cursor moves closer to an edge of the display area, as a speed of movement of the cursor increases, and/or as the amount by which the content area extends beyond the edge of the display area increases. Similarly, the panning facility may decrease the default amount when the cursor is farther from an edge of the display area, when the speed of the movement is lower, and/or when the amount by which the content area extends beyond the edge of the display area is lower. The adjustment may be performed in any suitable manner. For example, the panning facility may adjust the default movement amount in direction proportion to any of these factors, such as by increasing the default movement amount in direct proportion to increases or decreases in speed of movement of the cursor. As another example, the panning facility may adjust the default movement amount by certain amounts relative to thresholds. For example, if the panning facility determines that the distance of the cursor to the edge of the display area is below one threshold, then the panning facility may increase the default movement amount by one amount, and if the panning facility determines that the distance of the cursor to the edge of the display area is below another threshold (and thus closer), the panning facility may increase the default movement amount by a second, larger amount. The panning facility may also maintain, in some embodiments, maximum and minimum movement amounts. In such embodiments, after calculating the movement amount based on the information collected in blocks 602-608, the movement facility may determine whether the calculated movement amount exceeds the maximum or is less than the minimum and, if so, set the movement amount to the maximum or minimum, respectively.

Once the panning facility calculates the movement amount in block 610, in block 612 the panning facility may move the visible content elements of the markup language document by the calculated amount. The panning facility may move the visible contents in any suitable manner, as embodiments are not limited in this respect.

In some embodiments, the panning facility may execute a scripting language command to move the visible content elements. The scripting language command may be, for example, a JavaScript command to interact with a web browser. The JavaScript command may be a scrolling command instructing scrolling of a web page (including visible content elements of the web page). For example, a "window.scrollBy" command may be executed based on the calculated amount from block 610 (or a "window.scrollTo" command that includes a position calculated based on the amount from block 610).

In other embodiments, the panning facility may move the visible content elements by editing the markup language document. The panning facility may, for example, edit one or more markup elements of the markup language document to change a position of the visible content elements. As discussed above, editing the markup elements may include inserting one or more new markup elements and/or modifying existing markup elements, including modifying markup elements that may have been inserted by the panning facility in response to a prior movement of the cursor. The one or more markup elements edited by the panning facility may change a position of the visible content elements individually or collectively, such as by specifying a new position for each element or group of elements, or specifying a new position for all elements. In some embodiments in which the markup language document is a web page, the insert a CSS markup element that is a "transform" element for Cascading Style Sheets (CSS) 3.0. The transform element may be, for example, a "translate" element that takes as an argument a number of pixels to shift visible content elements in an X and/or Y direction and applies that shift to one or more content elements. The panning facility may specify a shift in an X direction, such as a shift in the negative/leftward direction when the cursor is approaching the right edge of the display area or a shift in the positive/rightward direction when the cursor is approaching the left edge of the display area. The panning facility may, for example, insert the "translate" markup element into a style sheet or inline style element in response to a first time that the panning facility is to move the visible content elements responsive to movements of the cursor. The panning facility may insert the "translate" element into any suitable portion of the style sheet or style element, including into a "body" region of the style sheet or style element to specify that the translation applies to all visible content elements included in the body of the markup language document. In cases in which the panning facility creates margins to monitor movements of a cursor and those margins are specified using invisible containers or other elements (as discussed above in connection with FIG. 5), the panning facility may specify that those elements are not to move, to ensure that the elements remain adjacent to the edge(s) of the display area. Subsequently, when the panning facility is to move the visible content elements again in response to movements of the cursor, the panning facility may edit the previously-inserted "translate" element to specify a different number of pixels by which to move the visible content elements, and/or a different direction in which to move the elements, in accordance with the movement amount calculated in block 610.

Once the panning facility has moved the visible content elements in block 612, the process 600 ends. As a result of the process 600, the visible content elements of the markup language document are moved, such as by the markup language document being edited to effect the movement. The panning facility may then continue to monitor movements of the cursor and may, in response to future movements of the cursor, again move the visible content elements.

As should be appreciated from the foregoing, in some embodiments the panning facility may be implemented as scripting language code that is incorporated into a markup language document, such as code that is incorporated into an HTML document. In some such cases, the panning facility may be incorporated into the markup language manually, by a developer (e.g., a web developer) that creates the markup language document. The panning facility may be incorporated by a developer in cases where the developer expects that a substantial number of users of the markup language document may benefit from use of the panning facility, such as in a case that many of the users will have difficulties or disabilities in eyesight or may be unfamiliar with the operations of computers.

In other embodiments, however, the panning facility may be incorporated into the markup language document automatically, such as by an insertion facility that is configured to insert the panning facility into markup language documents. The insertion facility may be implemented in any suitable manner, as embodiments are not limited in this respect. In some embodiments, for example, the insertion facility may be implemented as part of a proxy server or other server that relays markup language documents. The proxy server may, for example, be a server that is intended for use by users who have difficulties or disabilities with eyesight, or are unfamiliar with the operations of computers. These users may access markup language documents via the proxy server such that the proxy server relays the documents to the devices after the proxy server has edited the documents to insert the panning facility, such that the panning facility is available for use by the users. Such a proxy server may be used in any suitable manner, including known techniques. As one example, a viewing application (e.g., web browser) may be configured to access markup language documents via the proxy server.

As another example of a manner in which an insertion facility may operate to incorporate the panning facility into the markup language document, the insertion facility may be implemented as a portion of a viewing application, such as a plug-in to a viewing application, that is executed on a device operated by a user. When the user operates the viewing application to download and process markup language documents, the insertion facility may edit the markup language documents to incorporate the panning facility.

Figure 7:
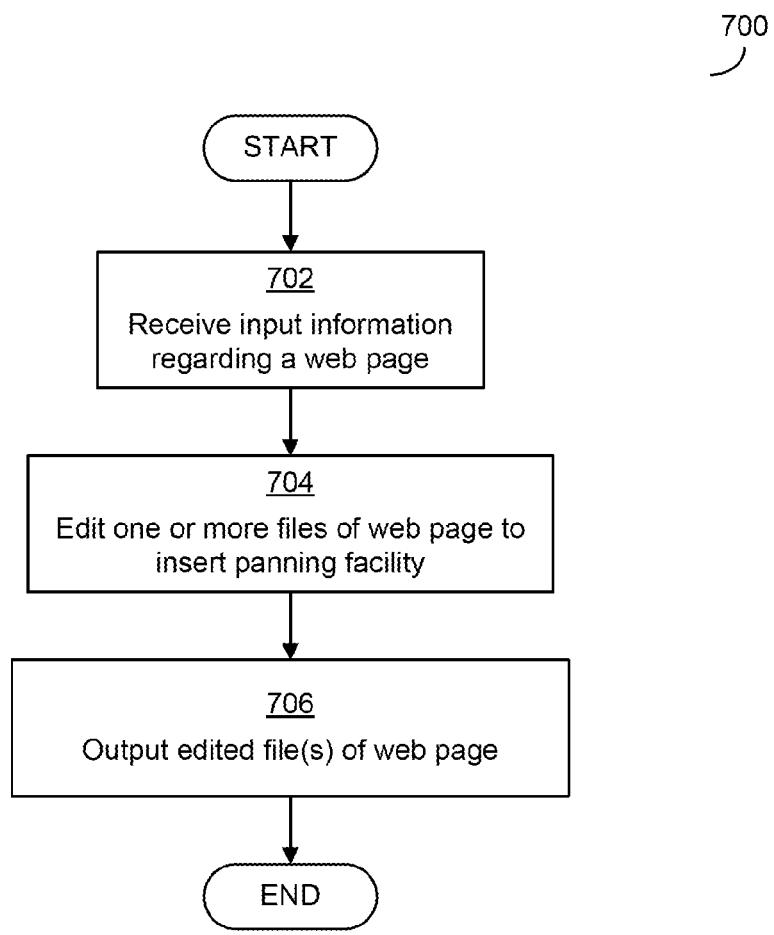
FIG. 7 is a flowchart of an exemplary process by which an insertion facility may incorporate a panning facility into a markup language document.

FIG. 7 illustrates an example of a process that an insertion facility may carry out in some embodiments to incorporate a panning facility into a markup language document. The process 700 of FIG. 7 begins in block 702, in which the insertion facility receives input information regarding a markup language document. The information received in block 702 may be the markup language document itself or information describing the markup language document, such as an address from which the markup language document may be downloaded. If the insertion facility does not receive the markup language document in block 702, the insertion facility downloads the markup language document. In block 704, the insertion facility edits the markup language document to incorporate the panning facility. As discussed above, the panning facility may be incorporated in any suitable manner, including by being inserted entirely into the markup language document or by being disposed in one or more other files that is/are referenced by one or more markup elements of the markup language document. Once the edited of block 704 is completed, in block 706 the insertion facility outputs the edited markup language document, such as by passing the edited markup language document to another component of a viewing application to be processed or by communicating the edited markup language document over a network. After the output of block 706, the process 700 ends.

Figure 8:
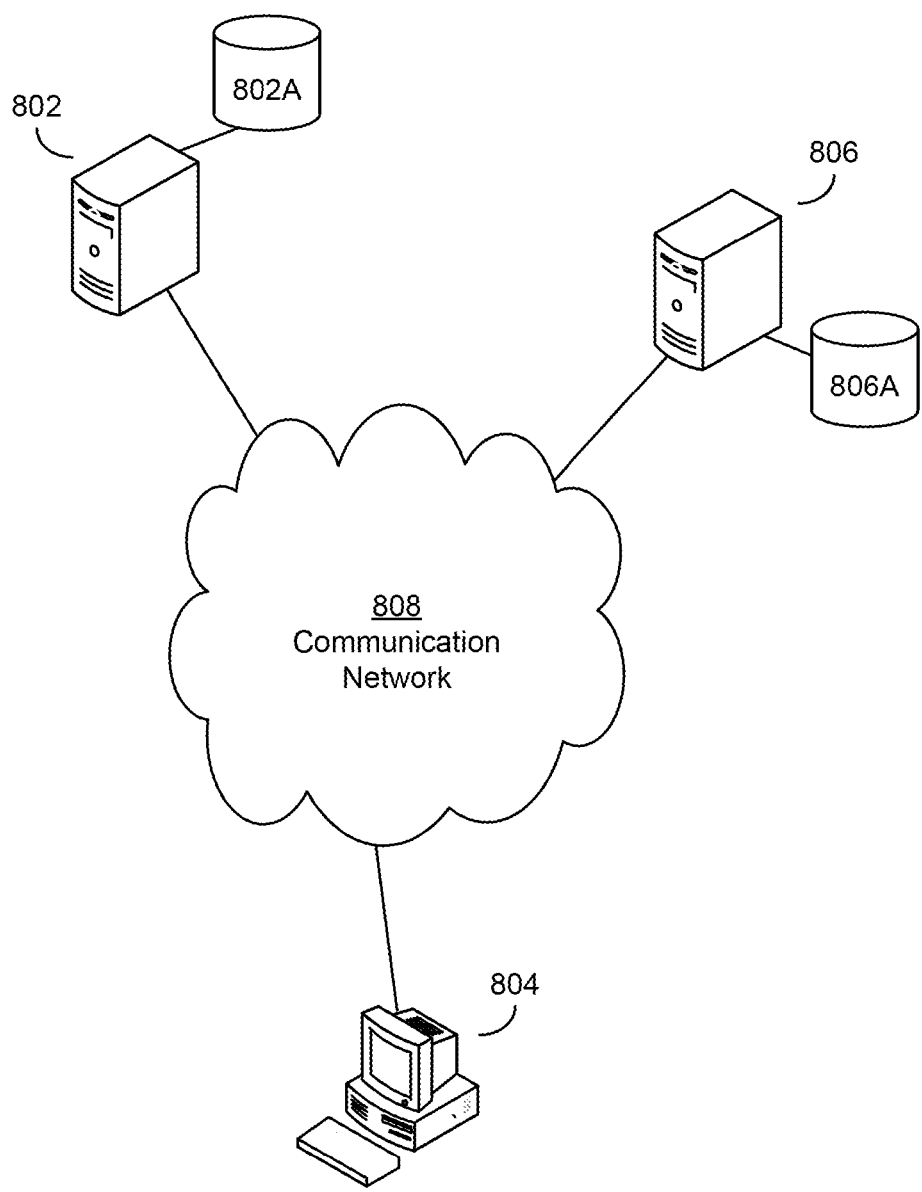
FIG. 8 is an illustration of a computer system with which some embodiments may operate.

FIG. 8 illustrates an example of a computer system in which some embodiments may operate. The computer system of FIG. 8 includes a computing device 802 that includes a data store 802A. While computing device 802 is illustrated as a single server, it should be appreciated that it may be implemented as any suitable one or more computing devices that may communicate over a communication network, as embodiments are not limited in this respect. Data store 802A may also be implemented in any suitable manner. Data store 802A may store one or more markup language documents. The computer system also includes a computing device 804 that may execute a viewing application that is operated by a user to download, process, and display a markup language document. While the computing device 804 is illustrated in FIG. 8 as a desktop personal computer, it should be appreciated that embodiments are not so limited and that the device 804 may be implemented as a laptop personal computer, a smart phone, a tablet computer, a gaming device, a web-enabled television, or any number of other devices that may be operated by users to download, process, and view markup language documents. In some embodiments, the computing device 804 may communicate directly with the computing device 802 to request a markup language document stored in the data store 802A, and the markup language document returned from the device 802 may have a panning facility incorporated therein. In other embodiments, as discussed above in connection with FIG. 7, the computing device 804 may request the markup language document via an intermediary computing device 806. The intermediary computing device 806, which may be implemented as any suitable computing device, may have a data store 806A that stores a panning facility. The intermediary computing device 806 may act as a relay for markup language documents between the device 802 and the device 804 and may, as part of the relay, edit the markup language document to insert a panning facility. Communications between the devices 802, 804, and 806 may be exchanged via a communication network 808, which may be any suitable one or more wired and/or wireless computer networks, including local area networks, wide area networks, and/or the Internet.

Techniques operating according to the principles described herein may be implemented in any suitable manner. Included in the discussion above are a series of flow charts showing the steps and acts of various processes that move visible content elements of a markup language document responsive to movements of a cursor of a pointing device. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 906, 1006 of FIGS. 10 and 11 described below (i.e., as a portion of computing devices 900 or 1000) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information.

For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 8, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register or a computer-readable storage medium accessible via a bus, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

Figure 9:
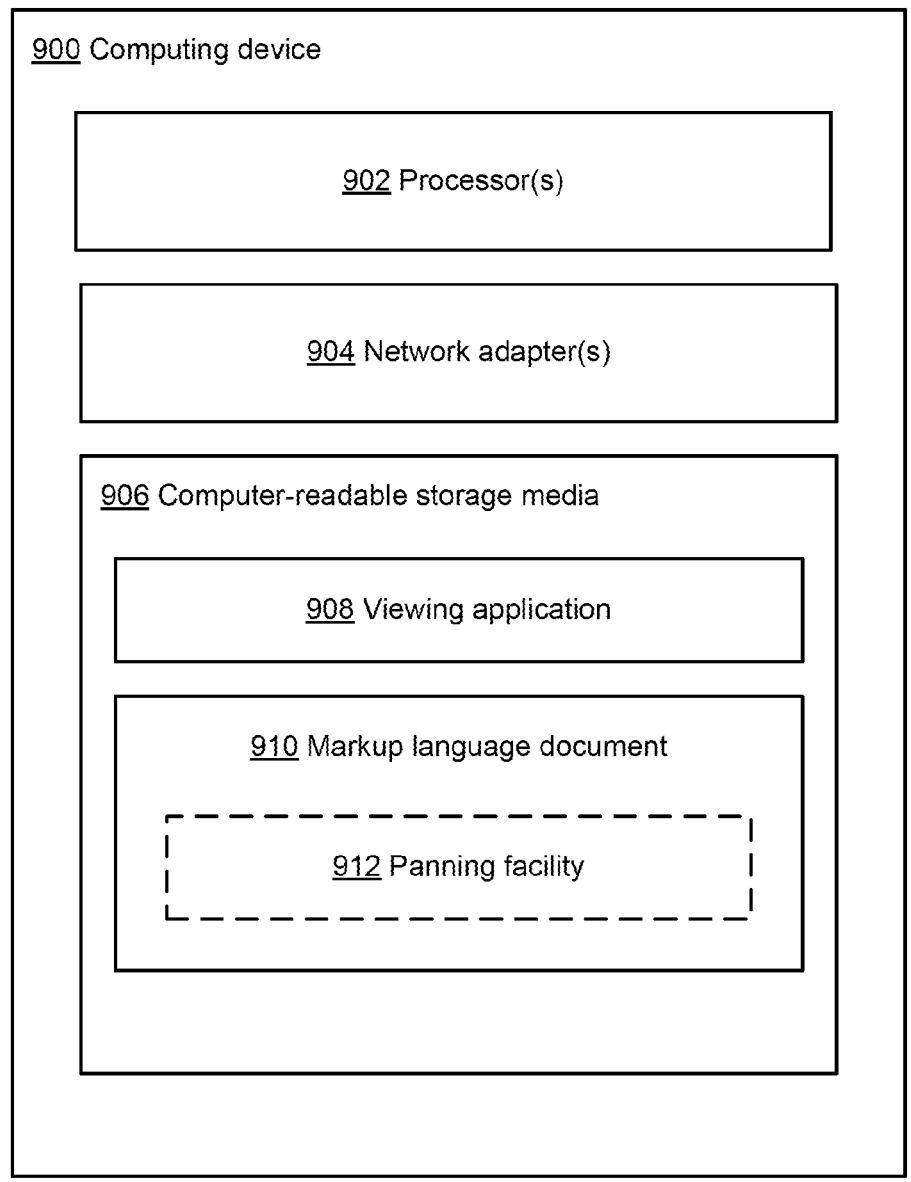
FIG. 9 is a block diagram of some components of a computing device with which some embodiments may operate.

FIG. 9 illustrates one exemplary implementation of a computing device in the form of a computing device 900 that may be used in a system implementing techniques described herein, although others are possible. It should be appreciated that FIG. 9 is intended neither to be a depiction of necessary components for a computing device to operate as a client computing device, operated by a user, in accordance with the principles described herein, nor a comprehensive depiction.

Computing device 900 may comprise at least one processor 902, a network adapter 904, and computer-readable storage media 906. Computing device 900 may be, for example, a desktop or laptop personal computer, a personal digital assistant (PDA), a smart mobile phone, a server, a gaming device, or any other suitable computing device. Network adapter 904 may be any suitable hardware and/or software to enable the computing device 900 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 906 may be adapted to store data to be processed and/or instructions to be executed by processor 902. Processor 902 enables processing of data and execution of instructions. The data and instructions may be stored on the computer-readable storage media 906.

The data and instructions stored on computer-readable storage media 906 may comprise computer-executable instructions implementing techniques which operate according to the principles described herein. In the example of FIG. 9, computer-readable storage media 906 stores computer-executable instructions implementing various facilities and storing various information as described above. Computer-readable storage media 906 may store a viewing application 908, which may implement known techniques for processing one or more markup language documents. The media 906 may additionally store a markup language document 910 into which a panning facility 912 is incorporated.

Figure 10:
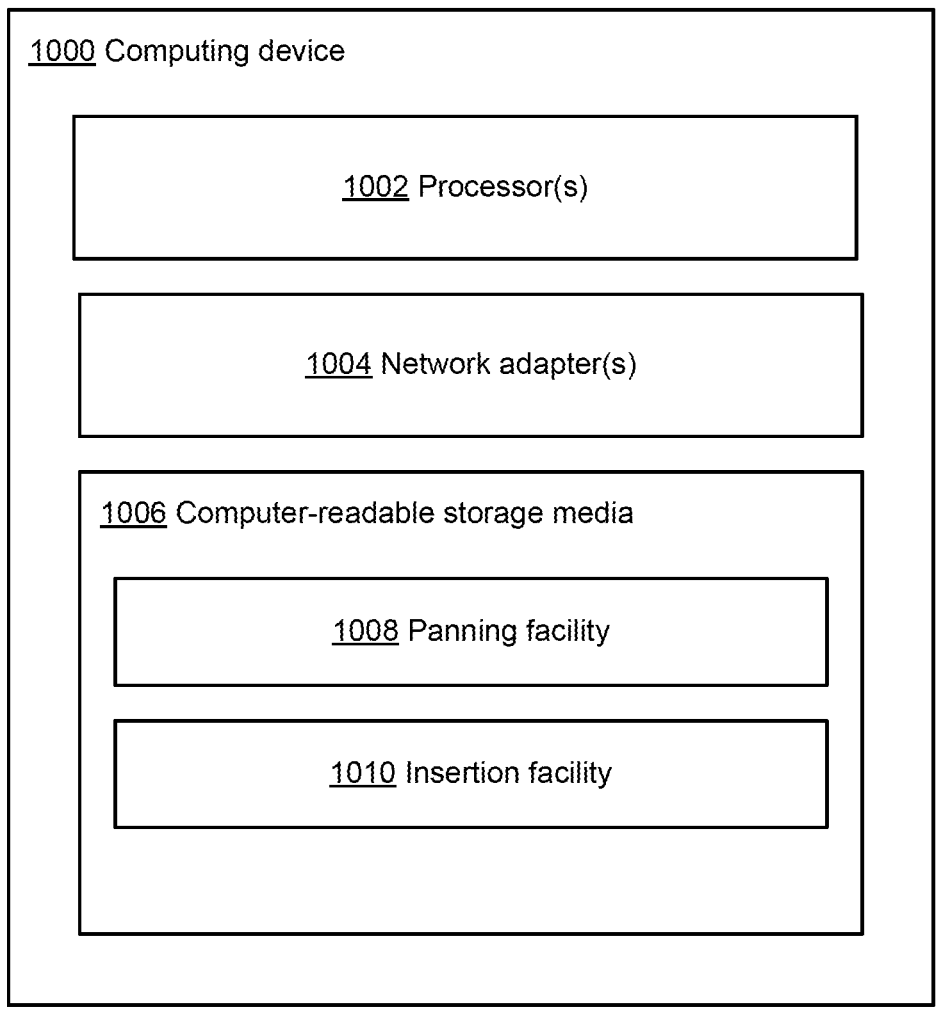
FIG. 10 is a block diagram of some components of a computing device with which some embodiments may operate.

FIG. 10 illustrates one exemplary implementation of a computing device in the form of a computing device 1000 that may be used in a system implementing techniques described herein, although others are possible. It should be appreciated that FIG. 10 is intended neither to be a depiction of necessary components for a computing device to operate as a server (e.g., device 802 of FIG. 8) or as an intermediary computing device (e.g., device 806 of FIG. 8), to insert a panning facility into a markup language document, in accordance with the principles described herein, nor a comprehensive depiction.

Computing device 1000 may comprise at least one processor 1002, a network adapter 1004, and computer-readable storage media 1006. Computing device 1000 may be, for example, a desktop or laptop personal computer, a personal digital assistant (PDA), a smart mobile phone, a server, a gaming device, or any other suitable computing device. Network adapter 1004 may be any suitable hardware and/or software to enable the computing device 1000 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 1006 may be adapted to store data to be processed and/or instructions to be executed by processor 1002. Processor 1002 enables processing of data and execution of instructions. The data and instructions may be stored on the computer-readable storage media 1006.

The data and instructions stored on computer-readable storage media 1006 may comprise computer-executable instructions implementing techniques which operate according to the principles described herein. In the example of FIG. 10, computer-readable storage media 1006 stores computer-executable instructions implementing various facilities and storing various information as described above. Computer-readable storage media 1006 may store a panning facility 1008. The media 1006 may additionally store an insertion facility 1010 to incorporate the panning facility into a markup language document.

While not illustrated in FIGS. 9 and 10, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are to by way of example only.

What is claimed is:

1. A method of moving visible content elements of at least one markup language document within a display area in which the at least one markup language document is displayed, wherein at least some of the visible content elements are disposed at positions at which they are at least partially disposed outside of the display area of the at least one markup language document, the method comprising:
    executing, with at least one processor, instructions incorporated within the at least one markup language document to cause the at least one processor to carry out acts of:
        determining an amount by which a content area of the at least one markup language document, including the visible content elements, extends beyond an edge of the display area on one side of the display area;
        setting a width of a margin area of the display area based at least in part on the amount by which the content area of the at least one markup language document extends beyond the edge of the display area on the one side of the display area, the margin area being a portion of the display area on the one side of the display area; and
        in response to detecting a user input moving a cursor of a pointing device in the margin area and toward the one side of the display area,
            determining whether the content area of the at least one markup language document, including the visible content elements, extends beyond the edge of the display area on the one side of the display area; and
            in response to determining that the content area extends beyond the edge of the display area on the one side, changing a position of at least some of the visible content elements.

2. The method of claim 1, wherein changing the position of the at least some of the visible content elements comprises moving the at least some of the visible content elements in a direction toward a second side of the display area opposite the one side.

3. The method of claim 2, wherein changing the position of the at least some of the visible content elements comprises executing at least one instruction, of the instructions incorporated into the at least one markup language document, instructing scrolling of the visible content elements in the direction.

4. The method of claim 1, wherein:
    changing the position of the at least some of the visible content elements comprises moving the visible content elements based at least in part on the amount by which the content area extends beyond the edge of the display area on the one side.

5. The method of claim 1, further comprising, in response to detecting the user input moving the cursor:
    detecting a first distance that the user input has moved the cursor,
    wherein changing the position of the at least some of the visible content elements comprises moving the visible content elements based at least in part on the first distance.

6. The method of claim 1, further comprising, in response to detecting the user input moving the cursor:
    determining a second distance from a position of the cursor resulting from the user input to the edge of the display area on the one side,
    wherein changing the position of the at least some of the visible content elements comprises moving the visible content elements based at least in part on the second distance.

7. The method of claim 6, wherein:
    the method further comprises, in response to detecting the user input moving the cursor, detecting a first distance that the user input has moved the cursor;
    changing the position of the at least some of the visible content elements comprises moving the visible content elements based at least in part on the first distance, the second distance, and the amount by which the content area extends beyond the edge of the display area on the one side; and
    changing the position of the at least some of the visible content elements based at least in part on the first distance, the second distance, and the amount by which the content area extends beyond the edge of the display area on the one side comprises:
        calculating a movement amount by which to move the visible content elements such that, if the user input continued to move the cursor by the first distance during successive user inputs, an edge of the content area would be positioned at the edge of the display area before or by a time that the cursor is positioned at the edge of the display area; and
        executing at least one instruction, of the instructions incorporated into the at least one markup language document, instructing scrolling of the visible content elements by the movement amount.

8. The method of claim 6, wherein changing the position of the at least some of the visible content elements based at least in part on the second distance comprises moving the visible content elements by successively greater amounts as the cursor moves closer to the edge of the display area in response to successive user inputs.

9. At least one computer-readable storage medium having encoded thereon executable instructions incorporated within at least one markup language document that, when executed by at least one processor, cause the at least one processor to carry out a method of moving visible content elements of the at least one markup language document within a display area in which the at least one markup language document is displayed, wherein at least some of the visible content elements are disposed at positions at which they are at least partially disposed outside of the display area of the at least one markup language document, the method comprising:
  determining an amount by which a content area of the at least one markup language document, including the visible content elements, extends beyond an edge of the display area on one side of the display area;
  setting a width of a margin area of the display area based at least in part on the amount by which the content area of the at least one markup language document extends beyond the edge of the display area on the one side of the display area, the margin area being a portion of the display area on the one side of the display area;
  in response to detecting a user input moving a cursor of a pointing device in the margin area and toward the one side of the display area,
    determining whether the content area of the at least one markup language document, including the visible content elements, extends beyond the edge of the display area on the one side of the display area; and
    in response to determining that the content area extends beyond the edge of the display area on the one side, changing a position of at least some of the visible content elements.

10. The at least one computer-readable storage medium of claim 9, wherein:
  changing the position of the at least some of the visible content elements comprises:
    calculating a movement amount by which to move the visible content elements in a direction away from the one side of the display area based at least in part on an amount by which the content area extends beyond the edge of the display area;
    in response to determining that the movement amount is below a first threshold amount, changing the position of the at least some of the visible content elements by the first threshold amount; and
    in response to determining that the movement amount is above a second threshold amount, changing the position of the at least some of the visible content by the second threshold amount.

11. The at least one computer-readable storage medium of claim 9, wherein:
  the method further comprises, in response to detecting the user input moving the cursor, detecting a first distance that the user input has moved the cursor; and
  changing the position of the at least some of the visible content elements comprises changing the position of the at least some of the visible content elements based at least in part on the first distance.

12. The at least one computer-readable storage medium of claim 11, wherein:
  the method further comprises, in response to detecting the user input moving the cursor, determining a second distance from a position of the cursor resulting from the user input to the edge of the display area on the one side,
  changing the position of the at least some of the visible content elements comprises changing the position of the at least some of the visible content elements based at least in part on the second distance.

13. An apparatus comprising:
  at least one processor; and
  at least one storage having encoded thereon executable instructions incorporated into at least one markup language document, wherein the executable instructions of the at least one markup language document, when executed by the at least one processor, cause the at least one processor to carry out a method of moving visible content elements of the at least one markup language document within a display area in which the at least one markup language document is displayed, wherein at least some of the visible content elements are disposed at positions at which they are at least partially disposed outside of the display area of the at least one markup language document, the method comprising:
    determining a first amount by which a content area of the at least one markup language document, including the visible content elements, extends beyond an edge of the display area on a first side of the display area;
    setting a width of a margin area of the display area based at least in part on the amount by which the content area of the at least one markup language document extends beyond the edge of the display area on the first side of the display area, the margin area being a portion of the display area on the first side of the display area; and
    in response to detecting a user input moving a cursor of a pointing device toward the one side of the display area:
      detecting a second distance that the user input has moved the cursor;
      determining a movement amount by which to move the visible content elements based at least in part on the first amount by which the content area extends beyond the edge of the display area on the one side and on the second distance; and
      moving the visible content elements, toward a second side of the display area opposite the first side, based at least in part on the movement amount.

14. The apparatus of claim 13, wherein:
  the at least one markup language document comprises a web page comprising HTML elements defining at least some of the visible content elements; and
  the executable instructions incorporated into the at least one markup language document comprises scripting language instructions disposed within the web page.

15. The apparatus of claim 13, wherein determining the movement amount comprises:
  calculating an initial movement amount based at least in part on the first amount by which the content area extends beyond the edge of the display area on the one side and on the second distance;
  in response to determining that the initial movement amount is less than a minimum movement amount, setting the movement amount to the minimum movement amount;

in response to determining that the initial movement amount is greater than a maximum movement amount, setting the movement amount to the maximum movement amount; and in response to determining that the initial movement amount is not less than the minimum movement amount and not greater than the maximum movement amount, setting the movement amount to the initial movement amount.

16. The apparatus of claim 15, wherein:

the method further comprises, in response to detecting a user input moving a cursor of a pointing device toward the one side of the display area, determining a third distance from a position of the cursor following the user input to the edge of the display area on the first side; and calculating the initial movement amount comprises calculating the initial movement amount based at least in part on the third distance.

17. The apparatus of claim 16, wherein calculating the initial movement amount based at least in part on the third distance comprises increasing the initial movement amount as the third distance decreases.

\* \* \* \* \*